(12) United States Patent
Nagel et al.

(10) Patent No.: US 8,252,402 B2
(45) Date of Patent: Aug. 28, 2012

(54) OPTICALLY DETECTABLE ADHESIVE TAPE WITH REDUCED GLOSS PROPERTIES

(75) Inventors: Christoph Nagel, Hamburg (DE); Niels Czerwonatis, Hamburg (DE); Christian Forsbach, Hamburg (DE); Kerstin Götz, Hamburg (DE)

(73) Assignee: tesa SE, Hamburg (DE)

( * ) Notice: Subject to any disclaimer, the term of this patent is extended or adjusted under 35 U.S.C. 154(b) by 0 days.

(21) Appl. No.: 12/764,217

(22) Filed: Apr. 21, 2010

(65) Prior Publication Data

US 2010/0288426 A1     Nov. 18, 2010

(30) Foreign Application Priority Data

May 14, 2009   (DE) .................. 10 2009 021 381

(51) Int. Cl.
 *B32B 9/00*   (2006.01)
 *B32B 33/00*  (2006.01)
 *B32B 7/12*   (2006.01)
 *C09J 7/02*   (2006.01)
(52) U.S. Cl. .............. 428/40.1; 428/195.1; 428/343
(58) Field of Classification Search ........... 428/40.1, 428/343, 195.1
 See application file for complete search history.

(56) References Cited

U.S. PATENT DOCUMENTS

| 4,927,710 | A |   | 5/1990  | Tanaka et al. |
| 5,650,215 | A | * | 7/1997  | Mazurek et al. ............ 428/156 |
| 6,714,437 | B1 | * | 3/2004 | Leiber et al. ................. 365/151 |
| 6,756,098 | B2 | * | 6/2004 | Zhou et al. ................... 428/40.1 |
| 2001/0036529 | A1 |  | 11/2001 | Calhoun et al. |
| 2005/0006520 | A1 | * | 1/2005 | Gassner et al. ........... 242/555.3 |

FOREIGN PATENT DOCUMENTS

| DE | 196 28 317 | 1/1998 |
| DE | 196 32 689 | 2/1998 |
| DE | 198 30 673 | 1/2000 |
| DE | 198 30 674 | 1/2000 |
| DE | 198 41 609 | 3/2000 |
| DE | 199 02 179 | 8/2000 |
| DE | 199 35 775 | 2/2001 |
| DE | 199 47 782 | 4/2001 |
| DE | 100 60 757 | 6/2002 |
| DE | 102 21 278 | 11/2003 |
| DE | 103 13 652 | 10/2004 |
| DE | 10 2005 050 758 | 4/2007 |
| DE | 10 2007 041 734 | 6/2008 |
| DE | 10 2007 008 889 | 8/2008 |
| DE | 600 37 331 | 10/2008 |
| DE | 10 2007 037 122 | 2/2009 |
| DE | 10 2007 048 280 | 4/2009 |
| EP | 0 725 809 | 8/1996 |
| EP | 0 757 657 | 2/1997 |
| EP | 0 951 518 | 10/1999 |
| JP | 7 305038 A | 11/1995 |
| WO | 95 11945 | 5/1995 |
| WO | 98 29516 | 7/1998 |
| WO | 03 18451 | 3/2003 |
| WO | 2007 079913 | 7/2007 |

* cited by examiner

*Primary Examiner* — Patricia Nordmeyer
(74) *Attorney, Agent, or Firm* — Norris McLaughlin & Marcus PA

(57) ABSTRACT

An adhesive tape for flying splice of flat web material which has been wound to form rolls, the adhesive tape having at least one carrier layer and a layer of adhesive, at least part of that surface of the carrier layer that faces that layer of adhesive being optically detectable, or optically detectable means being provided between the carrier layer and the layer of adhesive, and the layer of adhesive being designed such that the optical detection can be made through the layer of adhesive. The adhesive tape is modified such that its gloss value, i.e. the ratio of directed fraction and diffusely reflected fraction of the light stream incident on the surface, on the external surface of the layer of adhesive is reduced by at least 20% relative to an unmodified adhesive tape of otherwise identical construction.

16 Claims, No Drawings

OPTICALLY DETECTABLE ADHESIVE TAPE WITH REDUCED GLOSS PROPERTIES

The invention relates to an optically detectable adhesive tape for flying splice of flat web material which has been wound to form rolls.

Flying splice, especially in the printing industry, is a common method of replacing an old, almost unwound roll of a flat web material, such as a roll of paper, by a new roll, without having to stop the high-speed machines. In this procedure, the end of the old flat web is adhered to the start of the new flat web, in order to ensure continuous or near-continuous operation. It is carried out using double-sidedly self-adhesive tapes possessing high adhesiveness and high tack.

For adhesive bonding in flying splice there is a diversity of available products, including more particularly those which in addition to a paper carrier have a coating of water-soluble self-adhesive on either side.

Suitable adhesive tapes for flying splice possess, for example, a main carrier, provided on its facing side with a self-adhesive and on its bottom face with one or more self-adhesive systems that have a carrier which is flatly splittable or separable. Adhesive tapes of this kind are described by, for example, specifications DE 196 28 317 A1, DE 198 30 673 A1, DE 198 30 674 A1, DE 199 02 179 A1, EP 0 757 657 B1.

In an onward development of adhesive tapes for flying splice, there are detectable means integrated into the adhesive tape, which render the location bonded by means of the adhesive tape detectable by means of automatic devices (scanners, lasers, detectors) in ongoing operation. For instance, WO 03/18451 A discloses an adhesive tape for flying splice that is equipped with at least one device detectable optically by means of a detector. The adhesive tape thus integrates within itself a signal function for such detectors, which in the prior art before was accomplished by means of additional labels adhered subsequently. Particularly provision is made for a modification to the main carrier of an adhesive tape of this kind, effected, for example, by the application to said carrier of a detectable layer which can be detected through a layer of adhesive above said layer. In operation, for example, the adhesive tape is detected on acceleration of a new roll to which it is first adhered for affixing the final ply. In this way, the operation of flying splice, particularly the bonding of said adhesive tape to the end of an outgoing roll, can be initiated at the correct point in time, under automated control.

DE 100 60 757 as well discloses a method for flying splice in which a sensor detects markings provided on the new roll of paper, and produces signals allowing the position of the web start of the new roll of paper, in other words the bonding site, to be ascertained. The markings may also be arranged within the adhesive tape. Operational control can in that case take place by means of a central control unit or regulator unit.

The prior-art optically detectable adhesive tapes for flying splice, particularly in the printing industry and paper industry, therefore typically possess, on the side pointing towards the detector in operation, optically detectable means, such as an optically detectable layer, for example, and also the (self-) adhesive needed for adherence to the new web; typically in the form of an overlying layer.

At the surface of the adhesive, light striking the adhesive tape from the environment of the roll change apparatus undergoes specular reflection. This reflection of light, together with any light reflections likewise occurring on glossy flat webs (in the printing industry, in particular, print media, such as specially coated papers, for example), results in the problem that the detector which is intended to detect the position of the web start of the roll in operation, and particularly to initiate roll splice, receives signals that are not those it needs, and/or falsified signals, and that, in such a case, the process sequence becomes faulty, possibly going as far as to result in complete shutdown of the operation. Possible consequences of the disruption to the detection of the adhesive tape and/or the location of bonding, which at the same time represents the start of the web, may include the absent or erroneous sensor signal resulting in premature or late change in the speeds of the roll(s) of paper, or premature or late lowering of the pressing roll or of the cutting knife. A further possible result of absent or erroneous signals is that the detector does not indicate any reaction at all, and so the expiring roll of flat web (roll of paper), requiring replacement, runs out without the attachment of the new flat web (paper web). This gives rise to an expensive machine standstill. After such a standstill, the new web has to be inserted anew through the complete line.

In view of the fact that light sources are needed in the environment of almost every roll change apparatus, for the staff working on its operation, these light sources, as the actual cause of the problem, cannot be eliminated (workplace safety consideration).

It is an object of the invention to reduce susceptibility to errors during the optical detection procedure, and to increase the functional reliability.

This object is achieved by means of an adhesive tape as described hereinbelow.

The teaching of the invention encompasses an adhesive tape that is modified such that it very largely prevents disruptive reflection from its surface, and, even in the case of glossy print media that require processing, there is no disruption to the automated recognition of the adhesive tape and/or of the bond location. At the same time, the modification to the adhesive tape does not entail any significant influence on the technical adhesive properties of the adhesive tape; even at high speeds, the tape, at the moment of roll change, is required to adhere reliably to the outgoing web, the one that requires replacement, and to open the end bond of the new roll (in particular by splitting or separating within a splitting system), the location of what was hitherto the end bond of the new roll remaining, in particular, non-adhesive. The invention is therefore based on the concept of reducing the gloss effects on the surface of an adhesive tape in order to minimize optical disruption effects that result from the aforesaid gloss effects.

The solution to the problem is effectuated by means of an adhesive tape, particularly for flying splice of flat web material which has been wound to form rolls, having at least one external—though possibly provided temporarily with a liner material—layer of adhesive, the adhesive tape being optically detectable at least on the side of the layer of adhesive, in particular through the provision, within or below the layer of adhesive, of optically detectable means, and the layer of adhesive being designed such that the optical detection can be made through the layer of adhesive (or through the part-layer of adhesive situated within the layer of adhesive above the optical means). In accordance with the invention the adhesive tape is modified such that its gloss value, i.e. the ratio of directed fraction and diffusely reflected fraction of the light stream incident on the surface, on the external surface of the adhesive tape (i.e., the external surface of the layer of adhesive) is reduced by at least 20% relative to an unmodified adhesive tape of otherwise identical construction.

The gloss value for the purposes of this specification relates in each case to the determination made in accordance with DIN 67530, with measurement at an angle of 20° (arithmetic mean values from 5 individual measurements). The difference (reduction, attenuation) in the gloss values is related to these mean values.

The adhesive tape is advantageously an adhesive tape for flying splice of flat web material which has been wound to form rolls, the adhesive tape comprising at least one carrier layer and a layer of adhesive, furthermore at least part of that surface of the carrier layer that faces that layer adhesive being of optically detectable, or optically detectable means being provided between the carrier layer and the layer of adhesive, or optically detectable means being provided within the layer of adhesive, and the layer of adhesive being designed such that the optical detection can be made through the layer of adhesive (or through the part-layer of adhesive situated within the layer of adhesive above the optical means), the adhesive tape being modified such that its gloss value, i.e. the ratio of directed fraction and diffusely reflected fraction of the light stream incident on the surface, on the external surface of the adhesive tape (i.e. the external surface of the layer of adhesive) is reduced by at least 20% relative to an unmodified adhesive tape of otherwise identical construction.

An unmodified adhesive tape of otherwise identical construction therefore has the same constituents and dimensions as the adhesive tape of the invention and is produced in the same way, but the reference adhesive tape is not modified in such a way as to reduce its gloss value.

The entire viewed surface of the adhesive tape advantageously has the requisite gloss properties, although the invention can also be realized in such a way that only part of the surface of the adhesive tape possesses the requisite gloss properties. This may be useful, for example, when the optically detectable means are to occupy only part of the adhesive tape area, and the reduction in gloss properties is to be brought about especially in that part.

The adhesive tape can be modified for the required gloss properties advantageously by a modification to the layer of adhesive. For an advantageous adhesive tape, in particular, the layer of adhesive is modified such that its gloss value, i.e. the ratio of directed fraction and diffusely reflected fraction of the light stream incident on the surface, is reduced by at least 20%, relative to the untreated but otherwise identical layer of adhesive. An untreated but otherwise identical layer of adhesive is more particularly one which is based on the identical adhesive and has the same dimensions.

With particular advantage the gloss value of the adhesive tape of the invention is reduced by at least 30%, better still by at least 40%, preferably by at least 50%, very preferably by at least 75%. Hence it is possible, using structured liners, to achieve gloss reductions even of at least 80%.

With great preference the layer of (pressure-sensitive) adhesive has diffusion centers which effect the reduction in the gloss properties of the layer of adhesive. Diffusion centers for the purposes of the present inventive teaching are those "defect sites" (particles, granules, defects, cavities and the like) in the adhesive at which the light is scattered in such a way that on leaving the adhesive tape it is not detected as directedly reflected light.

The invention additionally relates to an adhesive tape for flying splice of flat web material which has been wound to form rolls, the adhesive tape comprising at least one carrier layer and a layer of adhesive, additionally at least part of that surface of the carrier layer that faces that layer of adhesive being optically detectable, or optically detectable means being provided between the carrier layer and the layer of adhesive, and the layer of adhesive being designed such that the optical detection can be made through the layer of adhesive, with fillers having been added to the layer of adhesive that are suitable for reducing the surface gloss of the layer of adhesive. These additives are preferably selected such that they impair as little as possible, and more particularly not at all, the other properties of the adhesive, especially its adhesive properties.

Fillers which have emerged as being particularly suitable with advantage for reducing the surface gloss of the layer of adhesive are fibrous additives.

Particular preference is given to adding polyethylene terephthalate fibers (PET fibers) to the adhesive. PET fibers which have emerged as being particularly suitable are those having an average length of up to 1 cm; one very advantageously employable kind of fibre is PET fibers having a length of 5.5 to 6.5 mm (profile projector) and a density of 1.38 g/cm$^3$ at 20° C. (DIN 51757).

The fibers are used advantageously in a fraction of at least 1 part by weight of fibers per 100 parts of (pressure-sensitive) adhesive, more preferably at least 1.5 parts by weight of fibers per 100 parts of (pressure-sensitive) adhesive, more preferably still at least 2.5 parts by weight of fibers per 100 parts of (pressure-sensitive) adhesive. At the upper end, even higher fibre fractions can be added in order to enhance the gloss-reducing properties (for instance, at least 3 parts by weight of fibers per 100 parts of (pressure-sensitive) adhesive, more preferably at least 5 parts by weight of fibers per 100 parts of (pressure-sensitive) adhesive, more preferably still at least 10 parts by weight of fibers per 100 parts of (pressure-sensitive) adhesive), but as the fibre fraction goes up there is then an increasing effect on the technical adhesive properties of the (pressure-sensitive) adhesive; moreover, adhesives blended with a high filler fraction are generally more difficult to process. Thus, for example, it may become difficult to produce a uniform, homogeneous coating pattern. Therefore it may be sensible to dilute the adhesive when it has an increased fibre fraction (addition of solvent and/or plasticizers and/or the like).

With particular advantage, the adhesive tape in which the layer of adhesive is provided with fillers is a tape in which the gloss value, i.e. the ratio of directed fraction and diffusely reflected fraction of the light stream incident on the surface, is reduced by at least 20% relative to an unmodified adhesive tape of otherwise identical construction, in other words an adhesive tape in accordance with the present invention.

A further subject encompassed by the invention is an adhesive tape for flying splice of flat web material which has been wound to form rolls, the adhesive tape comprising at least one carrier layer and a layer of adhesive, additionally at least part of that surface of the carrier layer that faces that layer of adhesive being optically detectable, or an optically detectable layer being provided between the carrier layer and the layer of adhesive, and the layer of adhesive being designed such that the optical detection can be made through the layer of adhesive, wherein at least one of the surfaces of the layer of adhesive, more particularly that surface of the adhesive that is external when the adhesive tape is in use, has been treated mechanically for the purpose of reducing the gloss value of the surface.

With particular advantage, the surface may have been roughened. It is also possible for there to be a structuring, more particularly a microstructuring, at least of one of the surfaces of the layer of adhesive. In a particularly advantageous way, at least that surface of the layer of adhesive that is on the outside in use is provided with a structuring, more particularly a microstructuring.

The at least one of the surfaces of the layer of adhesive may in this case advantageously have a profile within the adhesive surface, more particularly through incorporation of the complementary embossing structure of a structured surface.

The surface structure in the layer of adhesive may be produced more particularly by a method of the kind described in WO 2007/079913. Accordingly, adhesive layers are provided with release liners having three-dimensionally raised structured surfaces, the liners being joinable to the adhesive layer and detachable from it again, and, in addition, the structures in the surface of the liners being embossed as a complementary embossing structure into the adhesive layer.

An untreated but otherwise identical layer of adhesive in the sense in which this expression has been used so far is more particularly such a layer which—besides otherwise identical features—has been placed on a smooth liner material (surface roughness less than 1 µm) and envelopingly laminated therewith.

It is advantageous to provide in the liners a structure which on the layer of adhesive generates a pattern which provides for a high degree of diffuse reflection when the surface of the adhesive is irradiated with light. It is advantageous here if the structuring on the surface of the adhesive generates a multiplicity of diffusion centers.

Structures which have emerged as being particularly advantageous for reducing the gloss, in the adhesive surface of the adhesive tape of the invention, are those which have a structure depth of at least 10 µm or more, better still of 15 µm or more, preferably of 20 µm or more.

Having emerged as being particularly advantageous are microstructured surface structures which exhibit a number of designs (elevations and/or recesses, for example hemispheres, prisms, pyramids, ellipses, grooves) each having a height or depth, respectively, of at least 10 µm or more, better still of 15 µm or more, even better still of 25 to 250 µm.

The surface structures may more particularly be of the kind described for adhesive surfaces, especially pressure-sensitive adhesive surfaces, in specifications WO 95/11945 A (→EP 725 809 B1) and WO 98/29516 A (→EP 951 518 B1) or as described as being obtainable in the stated specifications. Consequently, the disclosure content of the stated specifications, especially of Claims 1 to 10 of WO 95/11945 A, of Claims 1 to 10 of EP 725 809 B1, of Claims 1 to 15 of WO 98/29516 A and of Claims 1 to 17 of EP 951 518 B1, and especially the surface topographies specified therein, are explicitly incorporated by reference in this context.

The adhesive tape of the invention as well in which at least one of the surfaces of the adhesive tape has been treated mechanically for the purpose of reducing the gloss value of the surface is, with particular advantage, a tape in which the gloss value, i.e. the ratio of directed fraction and diffusely reflected fraction of the light stream incident on the surface, is reduced by at least 20% relative to an unmodified adhesive tape of otherwise identical construction, in other words an adhesive tape according to the present invention.

The surface treatment for reducing the gloss behaviour may be actualized either in addition to the variant embodiment in which there is addition of filler to the layer of adhesive, or else as an alternative thereto. The latter embodiment of the invention may also be implemented in particular in cases where fillers cannot be used, or not in a desired amount.

The descriptions below represent developments of each of the subjects of the invention, and are not confined to particular embodiments.

The adhesive tape of the invention is advantageously designed such that it has a layer of adhesive which is—in use—external, there being provided beneath this external layer of adhesive, or within this external layer of adhesive, means which allow optical detection, particularly by means of suitable sensors or detectors (below, the term "detector" is intended to encompass all devices which allow optical detection—especially automated optical detection—of the detectable means). Detectors used may be optical reading devices, examples being scanners and/or lasers. Recognition is, more particularly, contactless.

For the detection procedure it is advantageous to give the external layer of adhesive a light-transmissive design, at least in the region of the optically detectable means within it or beneath it, in order to permit recognition to be made through the layer of adhesive. With particular preference, therefore, the external layer of adhesive is transparent, semitransparent or translucent in design.

An advantageously suitable optically detectable means is a colour layer and/or a reflecting layer—more particularly a metallically reflecting layer—beneath the external layer of adhesive; advantageously, a carrier layer of the adhesive tape that is provided there may be colored. The colour layer, or the coloring of a carrier layer, is advantageously white, black or silver; provided as a metallically reflecting layer may be a metallization of a layer of material—such as of a carrier layer of the adhesive tape—or else a metal layer.

As optically detectable means there may be, beneath the external layer of adhesive, more particularly applied to a carrier layer of the adhesive tape that is provided there, instead of the above-described colour layers or metallically reflecting layers, or in addition to them, markings which can be detected by the detectors. The markings may also be, for example, colour stripes and/or colour elements (more particularly white, black or silver), metal stripes and/or metal elements, line codes or barcodes, reflectors, diffraction gratings, holograms, to name but a few, and without wishing to imply any unnecessary limitation.

Use may also be made, for example, of systems in accordance with DE 199 35 775 A1, having a polymeric carrier in which atoms and/or molecules that alter the refractive index as a function of the information to be input are introduced at locations assigned to individual information units. Use may also be made of data media which have two or more layers of a polymeric carrier, through which layers it is possible to carry out reading and, where appropriate, writing from/to a preselected layer of the polymeric carrier; in this regard see, for example, DE 199 47 782 A1.

A further example of optically detectable devices are particular colorations of the main carrier that are likewise detectable by means of suitable detecting systems. Reference may be made here, for example, to systems in accordance with DE 199 32 902, where a polymeric carrier and an additional layer are provided, the additional layer comprising a dye and being locally alterable optically for the purpose of information storage.

The optical detection can also be brought about by the external layer of adhesive itself being colored, advantageously in black or silver. At the same time, in accordance with the invention, by means of suitable measures, the surface gloss of the layer of adhesive can be reduced, and in a particularly preferred procedure this can be accomplished by means of the colour pigments for coloring the layer of adhesive themselves.

With further advantage it is possible for there to be a composite composed of at least one (more particularly black) colored layer of adhesive and an external, light-transmissive layer of adhesive (the latter either with gloss-reducing modification or not; more particularly a light-transmissive layer of adhesive as already described above); in this way the advantages of a colored layer of adhesive can be realized without the colour particles soiling the substrates to be bonded (flat webs).

The detection of the optically detectable means and the implementation of the splicing operation may take place in principle in the same way as is disclosed in WO 03/18451. An advantage when using the adhesive tape of the invention and/or when carrying out the method of the invention, described below, however, is that the operational defects due to erroneous and/or missing signals are avoided through the minimizing of the gloss properties of the adhesive tape (and/or of the layer of adhesive).

In one particularly preferred way, the external layer of adhesive is a pressure-sensitive adhesive or self-adhesive.

Pressure-sensitive adhesives (PSAs) are, in particular, those polymeric compositions which—possibly as a result of appropriate additization with further components, such as tackifier resins, for example—are permanently tacky and durably adhesive at the application temperature (at room temperature, unless defined otherwise) and adhere on contact to a multiplicity of surfaces, exhibiting, in particular, instantaneous attachment (referred to as "tack"). They have the capacity even at the application temperature, without activation by solvents or by heat—but typically by the exertion of a greater or lesser pressure—to effect sufficient wetting of an adhered substrate to allow the development of sufficient interactions between adhesive and substrate for adhesion to occur. Influencing parameters essential for this include the pressure and the contact time.

The particular properties of pressure-sensitive adhesives derive in particular, among other factors, from their viscoelastic properties.

The adhesives used for the adhesive tapes of the invention advantageously have a high tack. By tack is meant the capacity of pressure-sensitive adhesives to produce instantaneous adhesion to a large number of materials. This property can be quantified for the individual materials on which the tack of a particular PSA is to be specified, in accordance, for example, with AFERA 4015 (Quick Stick) or PSTC-6 (Rolling Ball Tack). The tack of the adhesives used in accordance with the invention ought in particular to be sufficient to allow reliable (instantaneous) bonding even at speeds of 700 m/min or more. For the external layer of adhesive, or PSA layer, it is advantageous to realize adhesive coat weights of 30 to 100 g/m$^2$, though for the specific fields of use it may be entirely advantageous to deviate from this adhesive coat weight range, either upwardly or downwardly.

Acrylate PSAs have proved to be particularly advantageous PSAs for use. A PSA of this kind is used preferably that is based on a polymer composed of the following compounds: 30% to 60% by weight of butyl acrylate, 30% to 60% by weight of acrylic acid, 1% to 10% by weight of vinylcaprolactam, it being possible for these components to add to 100%, or for the PSA to contain further comonomers, with the weight fractions of all of the components adding up to 100% by weight.

Very advantageously the polymer for preparing the PSA is blended with a plasticizer, in which case it is an advantage for there to be 60% to 80% by weight of the plasticizer to 20% to 40% by weight of the polymer, and with particular advantage up to 1.5 parts by weight of a crosslinker are added per 100 parts of this PSA. Alternatively the PSA may be blended by the admixing of further polymers, resins or additives.

Further PSAs that can be used advantageously for the adhesive tape of the invention are disclosed in, for example, the specifications DE 102 21 278 A, DE 103 13 652 A, DE 10 2007 037 122 A, DE 10 2007 041 734 A, the disclosure content of which is hereby explicitly incorporated by reference.

The plasticizers, crosslinkers and other additives referred to in the aforementioned specifications may explicitly also be designated for the adhesives of the present application, even when the adhesive differs otherwise from those stated in those specifications.

The PSA used in accordance with the invention may further comprise orthophosphoric acid, more particularly in a fraction of up to 10% by weight, more preferably in a fraction of 2 to 5% by weight, based on the content of pure phosphoric acid in the PSA.

In terms of its construction, the adhesive tape designed in accordance with the invention may in principle be any adhesive tape that is suitable for splicing, and especially flying splice, and which can be given an optically detectable design. Reference may be made here, for example, to DE 196 28 317 A1, DE 196 32 689 A1, DE 198 30 673 A1, DE 198 30 674 A1, DE 198 41 609 A1, DE 199 02 179 A1, EP 0 757 657 B1.

One construction which has shown itself to be very suitable, for example, is that described in WO 03/018451 A1. A construction of this kind which can be realized advantageously likewise in the context of the present invention includes the features that the adhesive tape has at least one adhesive splittable system and is equipped with at least one device detectable optically using a detector. It is advantageous to use an adhesive tape which has at least one main carrier with at least one layer of a self-adhesive on the top face. Located on the bottom face of the adhesive tape is the splittable system, preferably in the form of a strip of a splittable system which on the exposed side is likewise self-adhesive. When used in a splicing operation, this splittable system splits in such a way that there are no tacky residues left over that hinder passage through the machine.

Very advantageously the adhesive tape has a main carrier with an optically detectable layer provided thereon and/or optically detectable means integrated therein, said layer/means being arranged on that side of the main carrier that faces the detector in the flying splice operation. Provided on the optically detectable layer or on the main carrier with the integrated optically detectable means is the external, more particularly light-transmissive, layer of adhesive.

Reference is made expressly to the embodiments described in WO 03/018451 A1.

The adhesive tape of the invention can be used in particular for flying splice. The operation may be carried out in principle by any procedure in which there is optical detection of the adhesive tape or of the bond site produced by means of the adhesive tape. The operation is conducted more particularly in the manner described in WO 03/18451 A, or as set out in DE 100 60 757 A. Each of the variant procedures described in those specifications can be carried out in the present context.

The invention, accordingly, further provides a method for flying splice of flat web material which has been wound to form rolls, wherein the topmost flat web (11) of a new roll is affixed to the underlying web (12) with an adhesive tape (1) which is equipped with at least one main carrier (2), at least one layer of a self-adhesive (3) on the top face, and at least one system (6), capable of producing a partable bond, on the bottom face, with part of the self-adhesive (3) being exposed on the top face of the adhesive tape, after which the new roll thus equipped is placed adjacent to an old, almost entirely unwound roll that requires replacement, and is accelerated to substantially the same rotational speed as said old roll, and then is pressed against the old web (13), the exposed self-adhesive (3) of the adhesive tape (1) adhering to the old web

(13) when the webs have substantially the same speeds, while at the same time the system (6) opens the bond of the topmost flat web (11) of the new roll to the underlying web (12) in such a way that, after opening has taken place, there are no adhesive regions exposed, the point in time of the operation of bonding of the old web (13) to the topmost web (11) of the new roll being determined by a detector, by the adhesive tape (1) or at least part thereof being recognized optically by the detector, where the layer of self-adhesive (3) is modified on the top face of the adhesive tape (1) in such a way that the gloss value on its external surface is at least 20% lower than that of an untreated but otherwise identical layer of adhesive.

It is particularly preferred for this purpose to use an adhesive tape of the invention.

The use of the adhesive tape of the invention and/or the implementation of the method of the invention result/s in a reduction in the frequency of errors, since the reliability of the optical detection process is increased. As a result of the inventive modification to the adhesive or to the surface of the adhesive, the detectors are undisrupted or are disrupted only to a substantially reduced extent. More particularly, a large part of the light incident on the layer of adhesive from light sources in the vicinity of the roll change apparatuses is reflected diffusely, and not directively, as a result of the inventive modification to the adhesive and/or its surface. At the same time, the adhesion properties of the adhesive, and particularly its high tack, are not substantially affected.

EXPERIMENTS

For the purpose of verifying the effect of the teaching according to the invention on the gloss properties of adhesive tape surfaces, the experiments described below were conducted.

For this purpose, measurements were carried out in accordance with DIN 67530 using a commercial gloss meter [Glanzmesser ZGM 1120 from Zehntner GmbH Testing Instruments, CH-Sissach]. The measurements were made at an angle of 20° (20° reflectometer value according to DIN 67530).

Test specimens: surfaces as indicated below.

All of the measurements took place following calibration using the associated calibration standard (refractive index approximated to 1.567); traceable to BAM (German Federal Institute for Materials Research and Testing, DE). Additionally serving as standards for comparison are the black surfaces not provided with adhesive (see reference Examples A, B and C). For assessing the teaching according to the invention, it is the relative values (change with adhesive) and not the absolute values that are important.

The surfaces of the layers of adhesive are conditioned by the corresponding coating/laminating techniques.

Preparation of the Adhesive:

642 g of a 30% strength solution of a free-radically polymerized polymer composed of 47% acrylic acid, 50% butyl acrylate and 3% vinylcaprolactam in a 1:1:1 mixture of water, isopropanol and acetone were blended with 357 g of polyoxyethylene(15)cocoamine (trade name Ethomeen C-25, Akzo; CAS No. 61791-14-8) and 0.70 g of the bisglycidyl ether of bisphenol A (bisphenol A-epichlorohydrin Mw<700; trade name Epikote 828 LVEL, Hexion, CAS No. 25068-38-6).

The polymer is characterized by a mass-average molar mass Mw of $9 \cdot 10^5$ g/mol and a polydispersity of 8.

In the case of Examples 2 to 4, the fillers indicated in the respective examples were added to the pressure-sensitive adhesive prepared in this way.

Coating:

The pressure-sensitive adhesive prepared as described above, as a 30% strength solution in a 1:1:1 mixture of water, isopropanol and acetone, was coated using a coating bar onto a release material (reference Example A2 and Examples 2 to 5: release liner smooth: siliconized polyethylene terephthalate film—surface roughnesses less than 1 μm; Example 1: release liner rough; siliconized, polyethylene-coated paper; channel structure with structured depth of 20 μm). After conditioning at room temperature for 120 minutes, the swatch specimens were dried at 100° C. for 20 minutes. The coat weight after drying was 50 g/m$^2$.

For the production of the test specimens, the resultant layer of pressure-sensitive adhesive was envelopingly laminated onto the black side of a paper carrier (paper carrier: commercial, single-sidedly coated, flexible packaging paper, 80 g/m$^2$, printed over the full area of one side with black printer's ink; adhesive coat weight after enveloping lamination likewise 50 g/m$^2$).

As a reference, a gloss measurement was carried out on the black side of a paper carrier as described above but without a layer of adhesive (identified below as reference paper; reference Example A1). A second reference measurement was performed with a second paper carrier on whose black side, however, a coating had been applied beforehand of the adhesive prepared as described above (50 g/m$^2$; no addition of fillers; no surface modification), application taking place as described above (enveloping lamination), and drying having taken place (reference Example A2; measurement on the adhesive surface, which appears outwardly to be black). As a result of this it was possible to find a slight reduction in the gloss value at an angle of 20°.

Corresponding specimens were investigated with modified layers of adhesive (Examples 1 to 5, adhesive coat weight in each case 50 g/m$^2$ on the above-described reference paper). The samples were modified as follows:

EXAMPLE 1

The adhesive prepared as described above was applied with a weight per unit area of 50 g/m$^2$ to a structured liner (siliconized, polyethylene-coated paper; channel structure with structure depth of 20 μm) in accordance with the general coating instructions above, and dried. This layer was envelopingly laminated onto the carrier paper (black side of a reference paper as described above), so that the complementary embossing structure of the structured liner was embossed in the now exposed adhesive surface. This surface was measured for its gloss characteristics.

EXAMPLE 2

The adhesive prepared as described above was admixed with PET fibers [length 5.5 to 6.5 mm (profile projector); density 1.38 g/cm$^3$ (DIN 51757; preparation of 1.0 g of fibers to 20 g of isopropanol)]. Intimate mixing produced an extremely homogeneous fibre distribution. The solids content amounted to 3 parts by weight of fibers per 100 parts by weight of adhesive (solid on solid). The additized adhesive was applied with a weight per unit area of 50 g/m$^2$ to the carrier paper (black side of a reference paper as described above) in accordance with the general coating instructions above, and dried. The adhesive surface was measured for its gloss characteristics.

EXAMPLE 3

The procedure of Example 2 was repeated; in this case, though, the fibre solids content was 1.6 parts by weight of fibers to 100 parts by weight of adhesive (solid on solid).

EXAMPLE 4

The adhesive prepared as described above was admixed with slurried chalk [3.3 g of chalk slurried in 11.8 g of acetone]. The solids content was 0.7 part by weight of fibers per 100 parts by weight of adhesive (solid on solid). The additized adhesive was applied, with a weight per unit area of 50 g/m$^2$, to the carrier paper (black side of a reference paper as described above) in accordance with the general coating instructions above, and dried. The adhesive surface was measured for its gloss characteristics.

EXAMPLE 5

The procedure of Example 2 was repeated; in this case, though, the chalk solids content was 3.9 parts by weight of chalk to 100 parts by weight of adhesive (solid on solid).
Results:

| Example | Brief description | Gloss unit (20°) mean value from 5 measurements |
|---|---|---|
| Reference A1 | commercial, single-sidedly coated, flexible packaging paper, 80 g/m$^2$, printed over the whole of one side with black printer's ink (without adhesive) | 155 |
| Reference A2 | untreated adhesive | 136 |
| Example 1 (inventive) | structured adhesive surface | 26 |
| Example 2 (inventive) | PET fibers, 3 parts by weight fibers/ 100 parts by weight adhesive | 51 |
| Example 3 (inventive) | PET fibers, 1.6 parts by weight fibers/ 100 parts by weight adhesive | 89 |
| Example 4 (not inventive) | slurried chalk, 0.7 part by weight chalk/100 parts by weight adhesive | 151 |
| Example 5 (not inventive) | slurried chalk, 3.9 parts by weight chalk/100 parts by weight adhesive | 133 |

It was shown (Examples 1 to 3) that by means of suitable fillers (PET fibers) and also by the surface modification of the layer of adhesive, it was possible to achieve significant reductions in the surface gloss of the layer of adhesive. Fillers such as chalk, in contrast, are not suitable for surface gloss reduction (Examples 4 and 5).

The invention claimed is:

1. An adhesive tape for flying splice of flat web material which has been wound to form rolls, the adhesive tape comprising at least one carrier layer and a layer of adhesive, wherein;
    (a) at least part of a surface of the carrier layer that faces that layer of adhesive is of optically detectable design; and
    (b) optically detectable means are provided between the carrier layer and the layer of adhesive;
    wherein the layer of adhesive is designed such that optical detection can be made through the layer of adhesive; and
    wherein the adhesive tape is modified such that its gloss value on an external surface of the layer of adhesive is reduced by at least 20% relative to an unmodified adhesive tape of otherwise identical construction, and wherein the adhesive comprises fibers added as filler.

2. Adhesive tape according to claim 1, wherein the adhesive tape is modified by a modification to the layer of adhesive.

3. Adhesive tape according to claim 2, wherein the layer of adhesive has diffusion centers which effect the modification to the layer of adhesive.

4. Adhesive tape according to claim 1, wherein the gloss value is reduced by at least 30%.

5. Adhesive tape according to claim 4, wherein fillers have been added to the adhesive to produce the diffusion centers.

6. Adhesive tape according to claim 5, wherein the fillers have been added in a fraction of at least 5 parts by weight of fillers per 100 parts by weight of adhesive.

7. Adhesive tape according to claim 6, wherein at least one of the surfaces of the layer of adhesive has a profile within the adhesive surface.

8. Adhesive tape according to claim 1, wherein at least one of the surfaces of the layer of adhesive has been treated mechanically for the purpose of reducing the gloss value of the surface.

9. Adhesive tape according to claim 8, wherein at least one surface of the layer of adhesive has been roughened.

10. Adhesive tape according to claim 1, wherein the adhesive of the layer of adhesive is a pressure-sensitive adhesive.

11. Adhesive tape according to claim 1, wherein the optical detectability is brought about by means of full-area, or part-area coloring at least of that surface of the carrier layer that faces the layer of adhesive.

12. Adhesive tape according to claim 1, wherein the optical detectability is brought about by a colored layer provided between the carrier layer and the layer of adhesive.

13. Adhesive tape according to claim 1, which has a reduced gloss value on said external surface of said layer of adhesive due to at least one of roughening of said external surface, structuring of said external surface, mechanical treatment of said external surface and incorporation of gloss value reducing fillers into said adhesive layer.

14. Method for flying splice of flat web material which has been wound to form rolls, said comprising affixing a topmost flat web of a new roll to an underlying web with an adhesive tape according to claim 1, said adhesive tape being equipped with at least one main carrier, at least one layer of a self-adhesive on a top face, and at least one system capable of producing a partable bond on a bottom face, said method further comprising:

a) exposing part of the self-adhesive being exposed on the top face of the adhesive tape;
b) placing the new roll thus equipped adjacent to an old, almost entirely unwound roll that requires replacement;
c) accelerating the new roll to substantially the same rotational speed as said old roll;
d) pressing the new roll against the old web so that the exposed self-adhesive of the adhesive tape adheres to the old web when the webs have substantially the same speeds, while at the same time the system opens the bond of the topmost flat web of the new roll to the underlying web in such a way that, after opening has taken place, there are no adhesive regions exposed; and
e) determining the point in time of the operation of bonding of the old web to the topmost web of the new roll by a detector, by detecting the adhesive tape or at least part thereof being recognized optically by the detector, wherein the layer of self-adhesive is modified on the top face of the adhesive tape in such a way that the gloss value on its external surface is at least 20% lower than that of an untreated but otherwise identical layer of adhesive.

15. Adhesive tape according to claim 1 wherein the filler fibers comprise PET fibers.

16. Adhesive tape according to claim 1 wherein the optically detectable means is selected from the group consisting of color stripes, color elements, metal elements, line codes or bar codes, reflectors, diffraction gratings, and holograms.

* * * * *